Patented Oct. 23, 1945

2,387,286

UNITED STATES PATENT OFFICE 2,387,286

SULPHURIZED CARDANOL ETHERS

Ferdinand P. Otto, Woodbury, N. J., assignor to Socony-Vacuum Oil Company, Incorporated, a corporation of New York No Drawing. Application November 25, 1943, Serial No. 511,703

8 Claims. (Cl. 260—125)

This invention has to do with new chemical compounds or reaction products which may be generally designated as sulphurized cardanol ethers or as sulphur-containing reaction products of cardanol ethers and elementary sulphur.

The present invention is predicated upon the discovery that the compounds or reaction products contemplated herein when blended with a viscous mineral oil fraction such as a hydrocarbon lubricating oil, will improve various properties of the oil. For example, these compounds or reaction products will inhibit oxidation of the oil, thereby retarding the formation of sludge and acidic products. They also retard changes in viscosity in the oil, with temperature change during use.

It is to be understood, however, that the present invention is not concerned with mineral oil compositions, such compositions forming the subject matter of my copending application Serial No. 424,127, filed December 23, 1941, of which the present application is a continuation-in-part and to which reference is made for further details in the composition of these compounds or reaction products.

It is also to be understood that the use of the compounds or reaction products contemplated herein is not confined to the improvement of mineral oils. For example, they may be used as cutting oils, rubber accelerators, etc., and as intermediates in the production of other chemical compositions. Numerous other uses and applications of these compounds or reaction products will be readily apparent to those skilled in the art from the description of their composition and typical methods for preparing them, as provided hereinafter.

As aforesaid, the compounds or reaction products of the present invention are obtained by reaction of cardanol ethers and elementary sulphur. The term "cardanol," as described in U. S. Patent 2,181,119, denotes a phenol having an empirical formula of $C_{20}H_{32}O$, and probable structural formula of $H_{27}C_{14}.C_6H_4.OH$ with one unsaturated bond in the $H_{27}C_{14}$-radical, which is meta to the —OH radical. The ethers of cardanol, or cardanol ethers, contemplated herein are those in which the hydrogen of the —OH radical has been replaced by an organic radical, as, for example, an aromatic or an aliphatic radical, with preference given to the cardanyl alkyl ethers.

The term "cardanyl" as used herein describes that group or radical which remains on the removal of the —OH group from cardanol, as

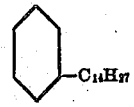

Making use of this term, the following structural formula represents cardanyl ethyl ether

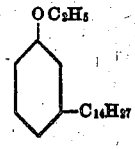

It is to be understood that all cardanol ethers are contemplated herein for reaction with elementary sulphur and that all organic radicals may replace the ethyl (—$C_2H_5$) radical shown above. In this regard, the organic radical may be alkyl such as methyl, propyl, butyl, decyl, etcyl, octadecyl, etc.; aralkyl such as benzyl, etc.; aryl as typified by phenyl, naphthyl, etc.; alkaryl as represented by methyl phenyl and methyl naphthyl, etc.; cycloalkyl as represented by cyclophenyl; etc.

While the mechanism of the reaction of cardanol ethers with elementary sulphur is, as yet, not wholly understood, it is most probable that sulphur reacts with the carbon atoms of the unsaturated bond of the alkyl group —$C_{14}H_{27}$, in the following manner,

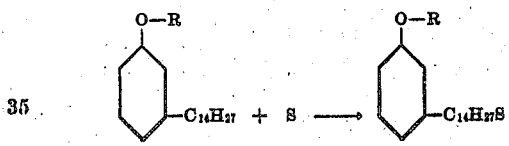

wherein R is an organic radical.

The foregoing suggested explanation of the reaction mechanism is merely speculation and is not in any way to be construed so as to limit the scope of this invention, for the sulphurized cardanol ethers herein described are contemplated broadly as the reaction products of elementary sulphur and cardanol ethers.

The reaction products contemplated herein are illustrated by those shown in the following typical examples.

EXAMPLE 1

REACTION PRODUCT OF ELEMENTARY SULPHUR AND CARDANYL ETHYL ETHER

One hundred and sixty grams of cardanyl ethyl ether and 16.2 grams of elementary sulphur were heated in the presence of a non-oxidizing gas, such as nitrogen, at approximately 175° C. for a period of 24 hours. During the reaction, practically no hydrogen sulphide was evolved, an indication that the major portion of the sulphur reacts with the unsaturated group of the alkyl side chain of the cardanyl ethyl ether. A copper strip test on a 1 per cent blend of the reaction product in a mineral oil, heated for 3 hours at 150° C. gave no appreciable discoloration of the copper strip, therefore indicating that all of the sulphur had been chemically combined. The product may be improved in color by contacting it for approximately ½ hour with 10 per cent to 20 per cent of super-filtrol clay, followed by filtration through more clay to obtain the finished product, which is a light brown oil and contains about 9 per cent sulphur.

EXAMPLE 2

REACTION PRODUCT OF ELEMENTARY SULPHUR AND CARDANYL OCTADECYL ETHER (a) Preparation of cardanyl octadecyl ether reaction mixture

| | Grams |
|---|---|
| Cardanol | 72 |
| n-Octadecyl chloride | 72 |
| Sodium dissolved in 150 cc. of butanol | 5.8 |

Procedure

The cardanol was added to the stirred solution of sodium butylate to form the corresponding sodium cardanolate. Octadecyl chloride was then added and the mixture was heated for 14 hours at 120° C. in an atmosphere of nitrogen. The butanol was then allowed to distill from the mixture and the temperature was gradually raised to 200° C. After heating for 5 hours at this temperature the product was cooled, diluted with benzol, acidified with dilute hydrochloric acid and water washed until neutral. The mixture was then topped under diminished pressure to 340° C. to remove unreacted cardanol and octadecyl chloride. The residue, representing the cardanyl octadecyl ether, was a fluid brown oil.

(b) Reaction product of (a) and elementary sulphur reaction mixture

| | Grams |
|---|---|
| Cardanyl octadecyl ether | 50 |
| Sulphur | 3 |

Procedure

The cardanyl octadecyl ether (prepared in (a)) and sulphur were heated, with stirring, for a period of 3 hours at 170° C. in the presence of a non-oxidizing gas such as nitrogen. The reaction mixture was then filtered to obtain the finished compound. A polished copper strip, immersed in a one per cent blend of the product in mineral oil, showed no discoloration after heating for 24 hours at 100° C., thereby indicating that all the sulphur was chemically combined. The sulphurized cardanyl octadecyl ether is a viscous brown oil containing 5.9% sulphur.

The preparation of typical reaction products shown above is but illustrative inasmuch as the reaction temperatures used therein may be varied considerably. For example, temperatures in the neighborhood of from about 110° C. to about 200° C. are satisfactory, but preference is given to reaction temperatures of the order of about 150° C. to about 175° C.

Similarly, it is preferred to react from about 0.5 to about 2.0 atomic proportions of sulphur with one mol of cardanyl ether in order to prepare the reaction products of this invention. Particularly preferred products, however, are prepared by reacting one atomic proportion of sulphur with one mol of a cardanyl ether under the foregoing reaction conditions.

It is to be further understood that although I have described certain preferred procedures for preparing the reaction products contemplated herein and have shown illustrative reaction products, the invention is not limited to the particular procedures or products, but includes within its scope such changes and modifications as fairly come within the spirit of the appended claims.

I claim:

1. As a new composition of matter, an oily, sulphur-containing reaction product obtained by reaction of a cardanol ether and elementary sulphur.

2. As a new composition of matter, an oily, sulphur-containing reaction product obtained by reacting a cardanol ether and elementary sulphur at a temperature between about 110° C. and about 200° C.

3. As a new composition of matter, an oily, sulphur-containing reaction product obtained by reaction of from about 0.5 to about 2.0 atomic proportions of elementary sulphur and about 1.0 mol of a cardanol ether at a temperature between about 110° C. and about 200° C.

4. As a new composition of matter, an oily, sulphur-containing reaction product obtained by reacting a cardanyl alkyl ether and elementary sulphur at a temperature between about 110° C. and about 200° C.

5. As a new composition of matter, an oily, sulphur-containing reaction product obtained by reaction of from about 0.5 to about 2.0 atomic proportions of elementary sulphur and about 1.0 mol of a cardanyl alkyl ether at a temperature between about 110° C. and about 200° C.

6. As a new composition of matter, an oily, sulphur-containing reaction product obtained by reaction of cardanyl ethyl ether and elementary sulphur at a temperature between about 150° C. and about 175° C.

7. As a new composition of matter, an oily, sulphur-containing reaction product obtained by reaction of one mol of cardanyl ethyl ether and one atomic proportion of elementary sulphur at about 175° C.

8. As a new composition of matter, an oily, sulphur-containing reaction product obtained by reaction of one mol of cardanyl octadecyl ether and one atomic proportion of elementary sulphur at about 170° C.

FERDINAND P. OTTO.